United States Patent [19]

Mohr

[11] 4,330,492
[45] May 18, 1982

[54] CARBURETOR

[76] Inventor: Russell R. Mohr, 103 Village Ave., Cannon Falls, Minn. 55009

[21] Appl. No.: 203,041

[22] Filed: Nov. 3, 1980

[51] Int. Cl.³ .......................................... F02M 15/02
[52] U.S. Cl. ........................... 261/145; 261/DIG. 39; 261/71; 261/78 R; 48/180 A; 123/546
[58] Field of Search ................ 123/546, 554; 261/145, 261/DIG. 39, 71, 78 R; 48/180 A

[56] References Cited

U.S. PATENT DOCUMENTS

| | | | |
|---|---|---|---|
| 1,133,845 | 3/1915 | Farnsworth | 123/546 |
| 1,312,469 | 8/1919 | Barricklow | 48/180 H |
| 1,326,000 | 12/1919 | Schmid | 123/554 |
| 1,378,867 | 5/1921 | Johnson | 261/145 |
| 1,795,898 | 3/1931 | Schneider | 261/DIG. 39 |
| 1,815,432 | 7/1931 | Deppe | 261/145 |
| 3,376,027 | 4/1968 | Kopa | 261/145 |
| 3,640,256 | 2/1972 | Low et al. | 123/546 |
| 3,664,648 | 5/1972 | Seeley, Jr. | 261/DIG. 39 |
| 3,787,037 | 1/1974 | Motooka | 48/180 H |
| 3,873,650 | 3/1975 | Lamkin | 261/DIG. 39 |
| 3,932,567 | 1/1976 | Skidmore | 261/30 |
| 4,083,343 | 4/1978 | Patton | 261/145 |
| 4,094,934 | 6/1978 | Tuckey et al. | 261/DIG. 39 |
| 4,106,457 | 8/1978 | Totten et al. | 123/546 |
| 4,148,285 | 4/1979 | Ahlers | 48/180 A |
| 4,167,165 | 9/1979 | Finlay et al. | 123/546 |
| 4,194,476 | 3/1980 | Lombardi et al. | 261/145 |

FOREIGN PATENT DOCUMENTS

| | | | |
|---|---|---|---|
| 12321 | 4/1933 | Australia | 261/DIG. 39 |
| 800923 | 12/1950 | Fed. Rep. of Germany | 123/554 |

*Primary Examiner*—Tim R. Miles
*Attorney, Agent, or Firm*—Norman P. Friederichs

[57] ABSTRACT

An improved carburetor (10) is disclosed and claimed by this application. The carburetor (10) includes an updraft section (16), a crossdraft section (18), and a downdraft section (20). The updraft section (16) includes a mixing chamber (22) in which fuel and air are mixed. This mixture formed therein passes into a plenum (84) of the crossdraft section (18) through which a plurality of ducts (88) extend. A hot fluid passes through these ducts (88) to heat the mixture passing through the plenum (84). The mixture, thereafter, passes through a plenum outlet (86) into another plenum (104) of the downdraft section (20) and to an intake manifold (12) for distributing the mixture to the cylinders of the engine.

16 Claims, 6 Drawing Figures

CARBURETOR

TECHNICAL FIELD

The invention of the present application refers broadly to the field of automotive mechanics. More specifically, however, it is concerned with carburetors for use with internal combustion engines. In a preferred embodiment, the invention relates to an improved carburetor including means for heating the air/fuel mixture after those two components are combined and vaporized.

BACKGROUND OF PRIOR ART

Because of a number of factors, not the least important of which is the rising cost of gasoline, the development of fuel efficient automobiles has become an urgent project of the world's technological community. Nor is there any indication that fuel costs will decline in the foreseeable future so as to reduce the importance of the development of more fuel efficient cars.

A number of factors bear upon the efficiency of the typical internal combustion engine used in the majority of automobiles produced in the United States and other countries. One of these factors is the degree to which the air/gasoline mixture introduced into the cylinders of the engine is vaporized. Many carburetors, which effect this function, currently in use on automobiles today do not effectuate sufficient vaporization in order to maximize the engine efficiency.

Degree of vaporization is basically the function of two factors: (1) the amount of dispersal and atomization of fuel droplets at the time the fuel is combined with air; and (2) the temperature of the mixture as it is introduced into the cylinders of the engine for combustion. With respect to the first of these factors, the typical carburetor relies upon a reduced pressure created within an induction pipe by an increased velocity of air flow to atomize gasoline being sucked out of a choke tube. Frequently, this process is not adequate to accomplish a desired degree of atomization.

With respect to the second factor, heating of air introduced into the induction pipe prior to its entry therein is relied upon to raise the temperature of the air/fuel mixture to the necessary level. An inadequately heated mixture often results since the temperature of the gasoline is lower than that of the air as it enters the induction pipe. Consequently, a transfer of heat energy from the air to the gasoline occurs at time of mixing, and the heated air temperature becomes lowered. Additionally, heat is expended during the vaporization process. A final cause of heat loss is the transfer of thermal energy from the air between the time it absorbs heat from the engine exhaust until the time it enters the induction pipe.

Another factor which reduces the efficiency of the automobile engine while it is operating is the inability to selectively regulate the relative amounts of air and gasoline which make up the mixture going into the cylinders in response to the conditions under which the car is being operated. During acceleration periods, a greater percentage of gasoline with respect to the percentage of air in the mixture is necessary than at higher highway cruising speeds. At these higher speeds and under conditions in which there is not frequent acceleration and deceleration, however, the percentage of gasoline with respect to the percentage of air can be significantly reduced without any appreciable reduction in efficiency of the automobile engine. Typically, cars commercially available on the market do not include mechanisms for selectively varying the air/gasoline ratio of the mixture being introduced at the cylinders of the engine.

It is these problems extant in the art to which the invention of the present application is directed. It provides a structure which causes the air/gasoline mixture to be heated virtually up until the point at which the mixture enters the engine cylinders. Additionally, it effectuates more complete atomization of the gasoline prior to it being combined with air so that more complete vaporization will occur. It also provides means for selectively regulating the volumes of both air and gasoline which combine to form the mixture introduced into the cylinders.

BRIEF SUMMARY OF THE INVENTION

The present invention is an apparatus for qualitatively conditioning the air/fuel mixture which enters the cylinders of an internal combustion engine. The apparatus includes a mixing chamber in which combining of the air and fuel occurs. Inlet means are provided to supply both fuel and air to the chamber. The chamber is in communication with a plenum through an entrance to the plenum. The air/fuel mixture, therefore, can pass from the chamber into the plenum and through the plenum to an outlet. Structure is provided for heating the air/fuel mixture while it passes through the plenum. After leaving the plenum through the outlet, the mixture is conveyed to the cylinders where it is combusted.

In one embodiment of the invention, a plurality of ducts can extend through the plenum, and exhaust gas taken from the engine exhaust pipe can be passed through these ducts. The heat from the exhaust gas will, thereby, be transferred to the air/fuel mixture after it is combined.

Passage of the combustable mixture through the plenum can be facilitated by providing an air jet within the plenum, the jet having a nozzle disposed proximate, and directed toward, the plenum's outlet. Such a structure creates a reduced air pressure and suction to cause the mixture to flow through the plenum.

The air ejected by the jet can be heated prior to its exiting the nozzle, but, in some cases, it may still have a lower temperature than that of the mixture exiting the plenum. In order to reheat the mixture, it can be passed through a second plenum having a conduit extending therethrough. As with the ducts in the first plenum, exhaust gas from the engine exhaust pipe can be passed through this conduit to provide a source of thermal energy.

In one embodiment, the invention includes structure for leaning the gasoline/air ratio in the mixture entering the cylinders. This can be accomplished by use of apparatus for selectively regulating the volume of gasoline, relative to that of air, which is introduced into the mixing chamber. In applications of the invention wherein it is used on an automobile, means can be provided for selectively regulating this volume remotely from the occupant compartment of the automobile.

A perferred embodiment of the invention includes a fuel dispersal and atomizing device within the mixing chamber for facilitating maximum vaporization of the gasoline as it is mixed with air. The device can include a circularly cylindrical, tubular fuel dispersal element which projects into the mixing chamber from a fuel inlet port. A bore, extending the length of the element, communicates, at an end by which the element is captured, with the fuel inlet port. The free end of the element is occluded by an imperforate portion of a disc-like closure member. A multiplicity of perforations are provided in the lateral wall of the dispersal element, through which perforations fuel in the bore passes radially outward and is partially atomized.

The disc-like closure member can include a peripheral portion which extends radially beyond the lateral wall of a dispersal element. That peripheral portion of the disc-like element can also include perforations disposed in the flow path of the vaporizing gasoline, and a second stage of atomization can occur as the gasoline passes through these perforations.

The invention of this application is thus a carburetor which provides improved efficiency of operation of the engine with which it is used. Specific advantages of the invention will become apparent with reference to the accompanying drawings, detailed description of the invention, and claims.

DETAILED DESCRIPTION OF THE INVENTION

Figure 1:
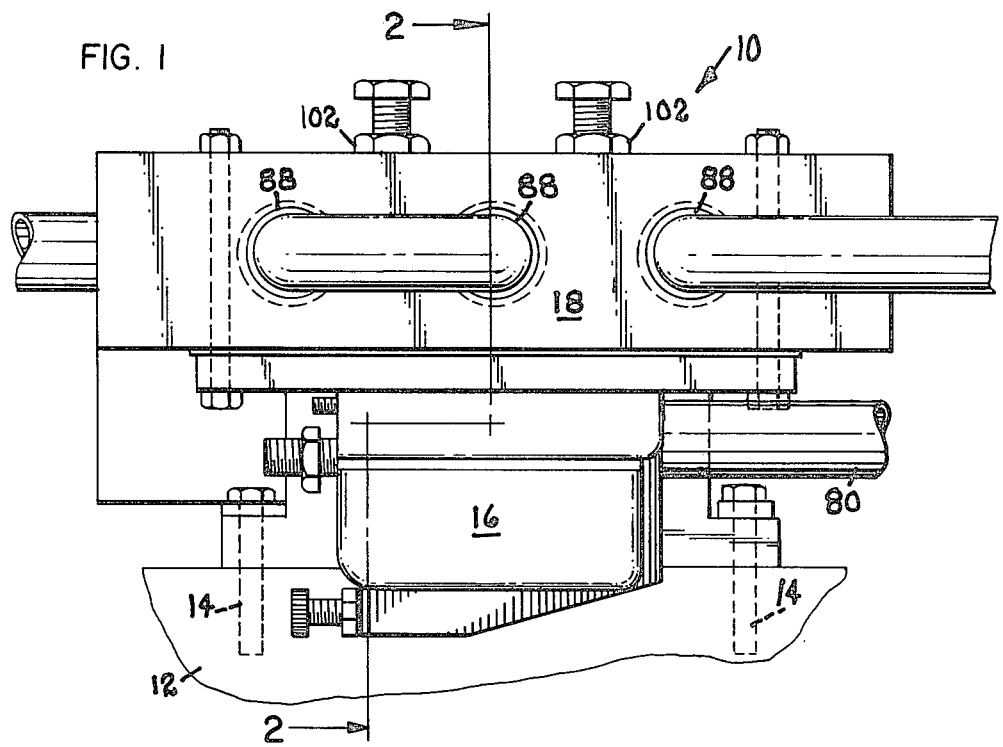
FIG. 1 is a side elevational view of an embodiment in accordance with the present invention.
Figure 2:
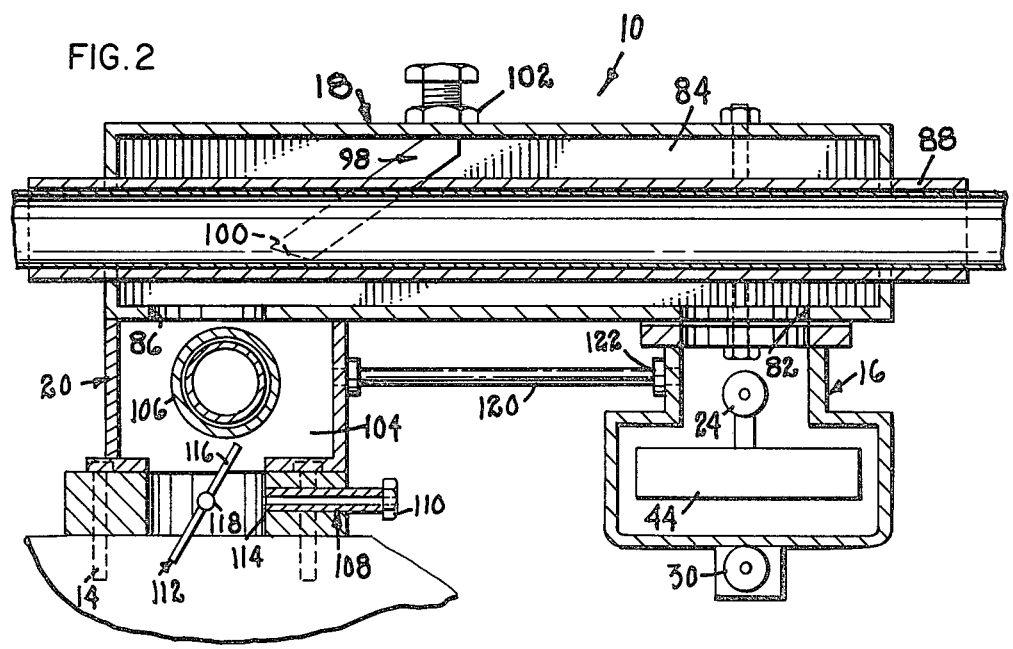
FIG. 2 is a view taken along line 2—2 of FIG. 1.
Figure 3:
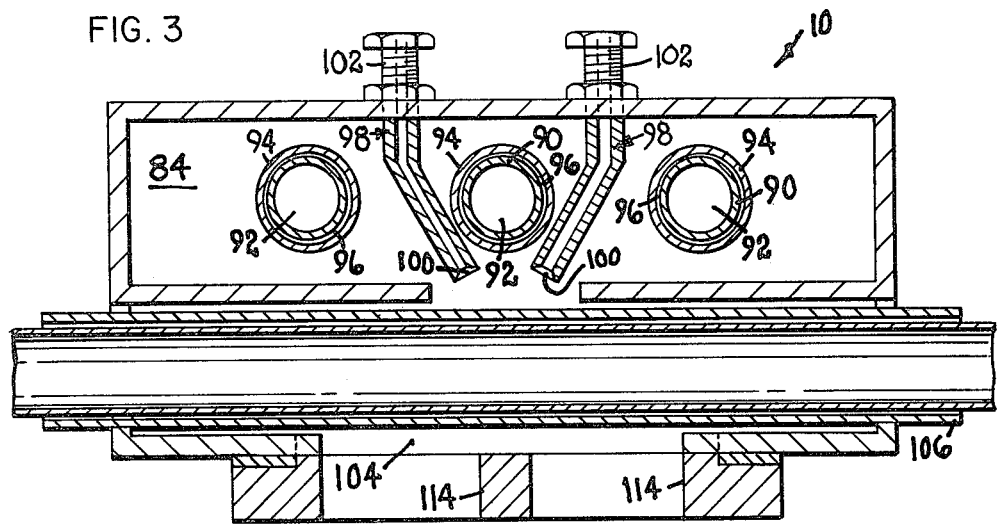
FIG. 3 is a side elevational view in cross section showing air jets, a second plenum, and a conduit by which the second plenum is heated.

Referring now to the drawings wherein like reference numerals denote like elements throughout the several views, FIGS. 1 and 2 illustrate a carburetor made in accordance with a preferred embodiment of the present invention. The carburetor, generally illustrated by the reference numeral 10, is shown, particularly in FIG. 2, as attached to an upper portion of an intake manifold 12 of the type typically on internal combustion engines which drive automobiles, trucks, and other vehicles. It will be understood that the carburetor 10 illustrated can appropriately be used both on 8 cylinder engines as used in large automobiles, trucks, and larger vehicles, and on 4 and 6 cylinder engines as used in small automobiles. The carburetor 10 can be attached to the intake manifold 12 by appropriate means such as bolts 14.

The carburetor 10 includes an updraft section 16, a cross draft section 18, and a downdraft section 20. It thus can efficiently utilize, and be positioned in a comparatively small, space.

Figure 4:
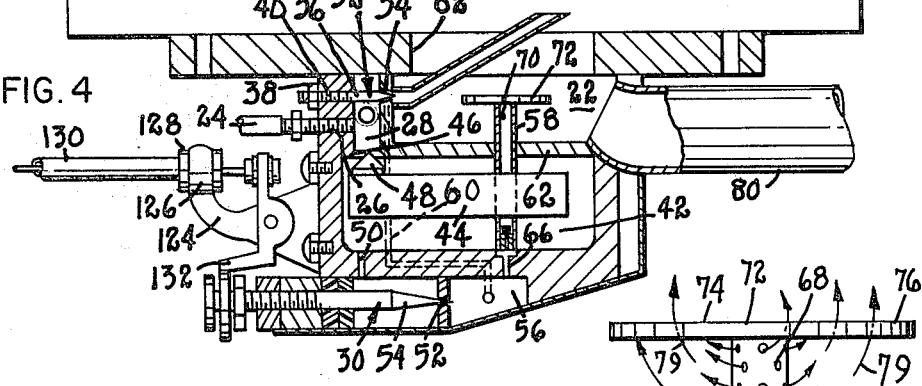
FIG. 4 is a side elevational view in cross section showing the mixing chamber and means for leaning the air/fuel ratio.
Figure 5:
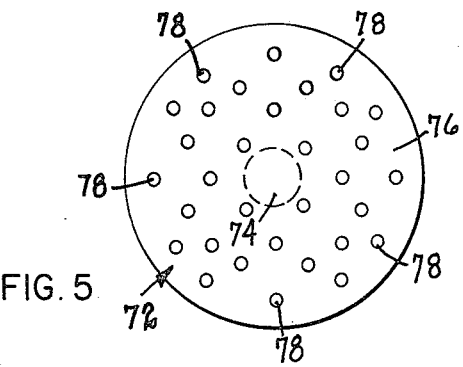
FIG. 5 is a plan view of the fuel dispersal and atomizing device of FIG. 6.
Figure 6:
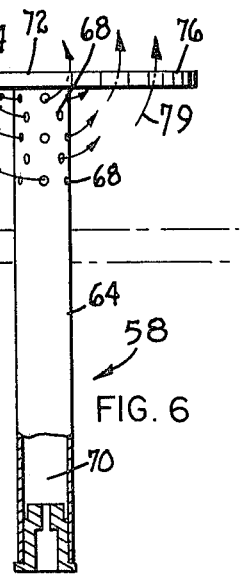
FIG. 6 is an elevational view of a fuel dispersal and atomizing device in accordance with one embodiment of the present invention, some portions thereof being broken away.

Referring now to FIG. 4, the updraft section 16 includes a mixing chamber 22 in which air and fuel are mixed. A fuel line 24 is provided to channel fuel from a tank or fuel heater (not shown) to a fuel inlet at the updraft assembly. The fuel line 24 can be coupled to the updraft assembly 16 by threading it into a female threaded orifice 26 formed in the wall of the updraft section 16. Fuel enters first into a first chamber 28 which provides fuel for both the main jet 30 and the idling jet 32. Fuel is continuously fed from chamber 28 to the idling jet 32 which comprises a needle valve having an orifice 34 and a needle element 36 which can be selectively moved axially with respect to the orifice 34 to manually adjust the fuel rate of flow therethrough. Typically, this setting is made and maintained during normal operation of the engine. Adjustments are made only when it is felt that the idle of the engine is either too fast or too slow. Adjustments can be made by loosening or tightening a lock nut 38 positioned on a shaft 40 extending from the needle element 36.

A reservoir 42 is provided to hold a ready supply of fuel to the main jet assembly 30. A float 44 is disposed within the reservoir 40 and positioned so that, as the float 44 rises, a port 46 from the fuel entry chamber 28 can be closed by a needle valve element 48 positioned on the float 44. Closure of the port 46 occurs as the reservoir 42 fills and the float 44 rises. As fuel from the reservoir 42 passes through a passage 50 to the main jet orifice 52, the fuel in the reservoir 42 will drop, the float 44 will lower, and additional fuel will pass into the reservoir 42 until the float 44 again rises to close the port 46.

The main jet 30 can be set in a fixed position so that a needle portion 54 thereof can be positioned relative to the main jet orifice 52 with a desired rate of fuel flowing through the orifice 52 per unit time.

Fuel passes through the main jet orifice 52 into a second chamber 56 which feeds a fuel dispersal and atomizing device 58 and a line augmenting flow through the idling jet 32. The dispersal and atomizing device 58 extends up through the main jet reservoir 42 and can serve as means for aligning the float 44 for vertical movement. The device 58 further extends through a generally horizontal plate 62 defining the upper wall of the reservoir 42 and into the mixing chamber 22.

The device 58 includes a fuel dispersal element 64 which can be a circularly cylindrical, tubular member which projects from the inlet port 66 into the mixing chamber 22. At its first end, the element's lateral wall encircles the port 66 providing access to the mixing chamber 22, and a second end of the element 64 which extends into the chamber 22 has a multiplicity of perforations 68 formed through the lateral wall.

The second end of the bore 70 formed in the tube 64 is closed by a closure member. This member can comprise a generally circular disk 72 mounted to the tubular element 64 at its second end. In one embodiment, the disk 72 can be disposed to define a plane generally perpendicular to the axis along which the tubular member 64 projects.

An interior portion 74 of the disk 72 is made imperforate to occlude the second end of the cylindrical element 64. Fuel which passes up the cylindrical member 64 by means hereinafter defined is thus forced to pass through the perforations 68 through the lateral wall of the member 64 and into the mixing chamber 22. By passing through these perforations 68, the fuel is dispersed in all directions and finally atomized.

The peripheral portion 76 of the disk 72 which extends laterally beyond the wall of the dispersal element 64 can also be perforated so that fuel droplets, as they rise, are passed through a second dispersal and atomization stage. Some fuel droplets may evade this second stage conditioning and pass outside the disk 72, but a large percentage of the droplets will, in fact, be passed through these perforations 78. Flow will generally be in a path illustrated by arrows 79.

Fuel line 60 extends from chamber 56 to the idling orifice 34. When the main jet 30 is open, therefore, fuel flow through the idling jet 32 will be augmented by fuel passing through line 60. If main jet 30 is closed, fuel flow to idling jet 32 through line 60 will be precluded.

An air intake 80 provides a source of heated air into the mixing chamber 22. The thermal energy which the air has can be obtained by passing it near a hot exhaust pipe (not shown).

As the heated air enters the mixing chamber 22, heat will be transferred to the already partially vaporized fuel droplets. As a result, a high degree of vaporization will occur. The air/fuel vapor will, thereafter, pass through a plenum entrance 82 into the cross draft section 18 of the carburetor 10.

The cross draft section 18 includes a plenum 84 extending between the updraft and the downdraft sections 16, 20. The air/fuel mixture passes through the plenum 84 and exits, at the opposite end thereof through the plenum outlet 86 into the downdraft section 20 of the carburetor 10.

As the mixture passes through the plenum 84, it is free to circulate around a plurality of ducts 88 extending through the plenum 84. The ducts 88 can have a substantially cylindrical inner wall 90 which defines an inner passage 92. Hot exhaust gases from the exhaust manifold or exhaust pipe can be made to pass through this inner passage 92. A substantially cylindrical outer wall 94, and in certain embodiments coaxial with the inner wall 90, is radially spaced outwardly from the inner wall 90 to define an annular chamber 96 between the two walls 90, 94. Provision of these ducts 88 effectuates a high degree of thermal energy transfer from the exhaust gases passing within the inner wall 90 to the air/fuel mixture circulating about the outer wall 94.

Means can be provided to induce flow of the mixture through the plenum 84. One or a series of air jets 98 can be positioned so that the nozzles 100 of the jets 98 are proximate, and directed toward, the plenum outlet 86. The reduced pressure which thereby results at the outlet end of the plenum 84 will cause the mixture to pass through the plenum 84 and about the ducts 88. Additionally, this creation of a vacuum at the outlet end of the plenum 84 will also effectuate the passing of fuel upwardly through the fuel dispersal and atomizing element 58.

Flow control valve means 102 can be provided to control the volume of air ejected by the nozzles 100 of the air jets 98 and to heat the air prior to its being introduced into the first plenum 84. Since it is an objective of the invention of this application to maintain the temperature of the air/fuel mixture at a high level by the provision of heating means in the plenum 84, the objective would be somewhat frustrated by inserting cold air at this point. As with the intake air injected into the mixing chamber 22, therefore, this air can be passed proximate either the exhaust manifold or exhaust pipe prior to being injected into the plenum 84 so that it will contain a significant amount of thermal energy.

The air/fuel mixture thus augmented by additional hot air from the air jets 98 passes through the plenum outlet 86 into the downdraft section 20 of the carburetor 10. The downdraft section 20 comprises a second plenum 104 immediately adjacent the first plenum 84. The air/fuel mixture can be conditioned both quantitatively and qualitatively at this stage. Qualitatively, additional heat can be added to the mixture by the provision of a conduit 106 extending through this second plenum 104, through which conduit exhaust gas is passed. The conduit 106 can be similar in cross sectional construction to that of the ducts 88 in the first plenum 84. Exhaust gases can enter this conduit 106 through an entry in one end thereof, pass through the conduit 106, and, thereafter, be vented.

Quantitatively, an additional air source 108 can be provided at this stage to reduce the relative proportion of fuel in the air/fuel mixture. A flow control valve 110 is provided for this purpose. As with air introduced into the mixture through the air jets 98 disposed in the first plenum 84, air introduced at this stage would also be preheated. As can be seen, therefore, the addition of heated air to the mixture at the various sections of the carburetor 10 provide additional heat to maximize the vaporization of the air/fuel mixture which eventually makes its way to the intake manifold 12.

A conventional butterfly valve 112 is mounted in a restriction 114 providing communication between the second plenum 104 and the intake manifold 12. A disc-shaped valve element 116 is caused to pivot about a shaft 118 and to open the restriction 114 in response to pressure brought to bear upon the acceleration peddle mounted in the occupant compartment of the vehicle in which the carburetor 10 is mounted. No further discussion of this particular structure will be made since its function and operation is well known in the art.

When starting a vehicle on a particularly cold morning, the air/fuel mixture going to the cylinders must be extremely rich. The invention of this application provides means for by-passing the first plenum 84 and pumping fuel directly from the updraft section 16 of the carburetor 10 to the downdraft section 20. A tubular bridge 120 is provided for this purpose. Valve means (not shown) can be included to selectively actuate flow of fuel through the tubular bridge 120. At its end 122 at which it communicates with the updraft section 16, the bridge 120 is attached to the wall thereof so that fuel supplied by the fuel line 24 to the first chamber 28 can be permitted to pass through the tubular bridge 120. Once the fuel reaches the second plenum 104, it is fed into the intake manifold 12 by manipulation of the acceleration peddle to open the butterfly throttle valve 112.

When the vehicle is accelerated to higher speeds and the speed is maintained relatively constant, the richness of the mixture can be decreased by use of leaning means for selectively regulating the volumetric flow of fuel through the main jet orifice 52 per unit time. As previously discussed, when the engine is not running the main jet valve needle can be adjusted so that the fuel flow rate is optimal considering all of the conditions under which the vehicle is operated. The leaning means, however, provides the operator of the vehicle with the ability to regulate the flow of fuel during operation.

A strut 124 can be made to extend from the wall of the updraft section 16 of the carburetor 10. A clamp portion 126 at the end of the strut 124 can secure a sleeve 128 supporting a bowden cable 130. One end of the cable 130 is mounted within the occupant compartment of the vehicle so that the vehicle's operator can manipulate the cable. The other end is attached to one end of a lever 132 pivotally mounted to the strut 124. The other end of the lever 132 is attached to the adjusting end of the needle control valve element 54. Pulling of the cable 130 by the vehicle's operator will cause a counterclockwise rotation of the lever 132 and a consequential axial movement of the needle valve element 54 into the orifice 52. This will reduce the fuel flow through the main jet orifice 52 and idling orifice 34 and lean the air/fuel mixture transiting to the intake manifold.

Numerous characteristics and advantages of the invention have been set forth in the foregoing description of a preferred embodiment. This description is, of course, only illustrative in many respects. Changes may be made in details, particularly in matters of shape, size, and arrangement of parts without exceeding the scope of the invention. It will be understood that the scope of the invention is defined in the language of the appended claims.

What is claimed is:

1. Apparatus for conditioning an air/fuel mixture for introduction into the cylinders of an internal combustion engine, comprising:
   (a) fuel inlet means;
   (b) air inlet means;
   (c) a mixing chamber into which said fuel and air inlet means converge and wherein fuel and air are mixed;
   (d) means for selectively adjusting the ratio of fuel to air in said mixture;
   (e) a plenum positioned above said mixing chamber and having an entrance at said mixing chamber providing communication between said plenum and said mixing chamber and an outlet providing communication between said plenum and said cylinders, said plenum including at least one duct extending through said plenum, said duct having an outer wall and an inner wall defining an annular chamber surrounding an inner passage through which hot exhaust gases can be made to pass, said annular chamber effectuating heat transfer from said hot exhaust gases traveling through said passage to said mixture, whereby said mixture is further vaporized; and
   (f) means for conveying said mixture from said outlet of said plenum to said cylinders, said means including a valve mounted in a restriction of said outlet for varying the rate of mixture transfer from said plenum to said cylinders, said plenum trapping and retaining said mixture until said valve opens said restriction and enables conveyance of said mixture to the cylinders; whereby said mixture is retained in said plenum and continuously heated and further vaporized until needed at said cylinders.

2. Apparatus in accordance with claim 1 further comprising means for inducing flow of said mixture through said plenum and to the cylinders.

3. Apparatus in accordance with claim 2 wherein said inducing means comprises at least one air jet disposed within said plenum and having a nozzle proximate, and directed toward, said outlet.

4. Apparatus in accordance with claim 3 further comprising means for heating air ejected by said at least one jet prior to its ejection from said nozzle.

5. Apparatus in accordance with claim 4 further comprising means for controlling the volumetric rate of flow of heated air ejected by said at least one jet.

6. Apparatus in accordance with claim 1 wherein said mixing chamber includes a wall defining said chamber and wherein said fuel inlet means comprises:
   (a) an orifice through said wall and entering into said chamber; and
   (b) means for selectively controlling the fuel flow rate through said orifice.

7. In combination with an automobile including an occupant compartment; apparatus in accordance with claim 6 wherein said selective control means comprises:
   (a) a needle valve having a needle member moveable axially into and out of a fuel port; and
   (b) remote means disposed in the occupant compartment of the automobile to control axial movement of said needle member.

8. Apparatus in accordance with claim 1, further including:
   (a) a fuel dispersal element having first and second ends and a bore extending between said ends, defined therein by a lateral wall, said lateral wall encircling said fuel inlet means at said first end of said element and having a multiplicity of perforations formed therethrough; and
   (b) a dispersal element closure member closing said second end of said element and having a portion extending peripherally beyond said lateral wall, said peripherally extending portion also having a multiplicity of perforations formed therethrough.

9. The combination of claim 8 wherein said lateral wall is generally circularly cylindrical and elongated in an axial direction.

10. The combination of claim 9 wherein said closure member is a circular disk coaxial with said lateral wall.

11. Apparatus in accordance with claim 1, further including:
    (a) a cylindrical, tubular element projecting along an axis from a carburetor fuel inlet means and having a captured end proximate said fuel inlet means and a free end opposite the port, said element having a bore, coaxial therewith, extending axially therethrough, and a plurality of perforations affording communication between said bore and an external surface of said element; and
    (b) a circular disk mounted to said element at said free end thereof, said disk having an imperforate interior hub portion closing said free end of said tubular element, and a perforated peripheral portion.

12. The device of claim 11 wherein said disk defines a plane generally perpendicular to said axis of projection.

13. A carburetor comprising:
    (a) an updraft section which includes:
        (i) fuel inlet means;
        (ii) air inlet means;
        (iii) fuel dispersal and atomizing means;
        (iv) means for mixing hot air with atomized fuel droplets; and
        (v) means for regulating the relative ratio of atomized fuel droplets to hot air;
    (b) a crossdraft section located above said updraft section into which said mixture is introduced from said updraft section and which includes:
        (i) a first plenum;
        (ii) a first plenum outlet;
        (iii) means for ejecting mixture flow through said first plenum to said outlet; and
        (iv) a plurality of ducts extending through said first plenum and having a heated exhaust passing therethrough, said ducts having a substantially cylindrical inner wall defining an inner passage through which exhaust passes, and a substantially cylindrical outer wall radially spaced from said inner wall and defining a closed annular space between said outer and inner wall, said annular space effectuating the controlled transfer of heat from said heated exhaust to said mixture;

(c) a downdraft section located below said crossdraft section into which said mixture is introduced from said crossdraft section and which includes:
   (i) a second plenum;
   (ii) a transfer means from said second plenum to cylinders of an engine to which the carburetor is attached, said transfer means including a valve for varying the rate of mixture transfer from said second plenum to said cylinders, whereby said mixture is trapped in said crossdraft section until transferred to said cylinders;
   (iii) means located in said downdraft section for further heating said mixture; and
   (iv) means located in said downdraft section for selectively adjusting ratio of fuel to air;

(d) means for selectively bypassing said crossdraft section and transferring said mixture directly from said updraft section to said downdraft section, whereby during cold starts, prior to engine exhaust being heated, the ratio of fuel to air in said mixture can be increased, thereby facilitating cold starts.

14. The carburetor of claim 13 wherein said further heating means comprises an elongated conduit extending through said second plenum and wherein said conduit and said ducts have entry ends which communicate with the exhaust pipe from the engine and through which exhaust from the engine enters said conduit and said ducts.

15. The carburetor of claim 13 wherein said fuel dispersal and atomizing means comprises:
   (a) a vertically disposed tube having a first end into which fuel flows, a second end, and a side wall enclosing a bore extending between said ends, said side wall having a multiplicity of perforations formed therethrough; and
   (b) a platen having an interior portion occluding said bore at said second end of said tube and a peripheral portion, said peripheral portion having a multiplicity of perforations formed therethrough.

16. The carburetor of claim 13 wherein said valve comprises a butterfly throttle valve.

* * * * *